(12) United States Patent
Cho et al.

(10) Patent No.: US 9,625,008 B2
(45) Date of Patent: Apr. 18, 2017

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 55 days.

(21) Appl. No.: 14/839,399

(22) Filed: Aug. 28, 2015

(65) Prior Publication Data

US 2016/0169340 A1   Jun. 16, 2016

(30) Foreign Application Priority Data

Dec. 11, 2014  (KR) .......................... 10-2014-0178389

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
CPC ..... F16H 2200/2046; F16H 2200/2012; F16H 3/66; F16H 2200/0073
See application file for complete search history.

(56) References Cited

U.S. PATENT DOCUMENTS

| 7,771,305 B1 * | 8/2010 | Hart ........................ F16H 3/666 475/282 |
| 9,217,493 B2 * | 12/2015 | Lippert ..................... F16H 3/44 |
| 2016/0169333 A1 * | 6/2016 | Cho ........................ F16H 3/66 475/275 |

(Continued)

FOREIGN PATENT DOCUMENTS

| JP | 2005-172123 A | 6/2005 |
| JP | 2009-197927 A | 9/2009 |

(Continued)

*Primary Examiner* — Sherry Estremsky
(74) *Attorney, Agent, or Firm* — Morgan, Lewis & Bockius LLP

(57) ABSTRACT

A planetary gear train of an automatic transmission for vehicles may include an input shaft receiving torque of an engine, an output shaft outputting changed torque, a first planetary gear set, a second planetary gear set, a third planetary gear set, a fourth planetary gear set, a first rotational shaft selectively connected to a transmission housing, a second rotational shaft directly connected to the input shaft, a third rotational shaft, a fourth rotational shaft, a fifth rotational shaft selectively connected to the first rotational shaft or the second rotational shaft, a sixth rotational shaft directly connected to the output shaft, a seventh rotational shaft selectively connected to the transmission housing, an eighth rotational shaft selectively connected to the fourth rotational shaft or the fifth rotational shaft, and six friction elements interposed between the rotational shafts, or between at least one rotational shaft and the transmission housing to connect selectively.

9 Claims, 2 Drawing Sheets

(56) References Cited

U.S. PATENT DOCUMENTS

| | | | |
|---|---|---|---|
| 2016/0169339 A1* | 6/2016 | Cho | F16H 3/66 |
| | | | 475/275 |
| 2016/0230849 A1* | 8/2016 | Haupt | F16H 3/66 |
| 2016/0258512 A1* | 9/2016 | Cho | F16H 3/66 |
| 2016/0333970 A1* | 11/2016 | Cho | F16H 3/66 |
| 2016/0333980 A1* | 11/2016 | Cho | F16H 3/66 |
| 2016/0341286 A1* | 11/2016 | Kato | F16H 3/66 |
| 2016/0356346 A1* | 12/2016 | Ji | F16H 3/66 |
| 2016/0356356 A1* | 12/2016 | Cho | F16H 3/66 |
| 2016/0356362 A1* | 12/2016 | Ji | F16H 3/66 |
| 2016/0356363 A1* | 12/2016 | Ji | F16H 3/66 |

FOREIGN PATENT DOCUMENTS

| | | |
|---|---|---|
| KR | 10-2012-0132022 A | 12/2012 |
| KR | 10-2014-0046240 A | 4/2014 |

* cited by examiner

FIG. 2

|      | C1 | C2 | C3 | C4 | B1 | B2 | 기어비 |
|------|----|----|----|----|----|----|-------|
| 1ST  | O  | O  |    |    |    | O  | 8.444 |
| 2ND  |    | O  | O  |    |    | O  | 5.481 |
| 3RD  | O  |    | O  |    |    | O  | 4.000 |
| 4TH  |    |    | O  |    | O  | O  | 2.667 |
| 5TH  |    |    | O  | O  |    | O  | 1.778 |
| 6TH  |    |    | O  | O  | O  |    | 1.212 |
| 7TH  | O  |    | O  | O  |    |    | 1.000 |
| 8TH  | O  |    |    | O  | O  |    | 0.784 |
| 9TH  |    | O  |    | O  | O  |    | 0.667 |
| 10TH | O  | O  |    |    | O  |    | 0.544 |
| 11TH |    | O  | O  |    | O  |    | 0.398 |
| REV  | O  |    |    | O  |    | O  | 2.667 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178389 filed Dec. 11, 2014, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles that implements 11 forward speeds by a minimum configuration to improve power transmission performance and reduce fuel efficiency.

Description of Related Art

In recent years, a rise in oil price causes a rise in competition for technologies to enhance fuel efficiency.

As a result, research into reduction of weight and enhancement of fuel efficiency through down-sizing is being conducted in the case of an engine and research for simultaneously securing operability and fuel efficiency competitiveness through multi-stages is being conducted in the case of an automatic transmission.

However, in the automatic transmission, as a gear stage increases, the number of internal components increases, and as a result, mountability, transmission efficiency, and the like may still deteriorate and cost, and weight may increase.

Accordingly, development of a planetary gear train which may bring about maximum efficiency with as small a number of components may be important in order to increase a fuel efficiency enhancement effect through the multi-stages.

In this aspect, in recent years, 8 and 9-speed automatic transmissions tend to be implemented and the research and development of a planetary gear train capable of implementing more transmission stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that implements 11 forward speeds and 1 reverse speed transmission stages with a minimum configuration and which may improve power transmission performance and reduce fuel efficiency through the multi-stages and may improve silent drivability of vehicle by using an operation point at a low rotation speed range of an engine.

According to various aspects of the present invention, a planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, a second ring gear, a third planetary gear set including a third sun gear, a third planetary carrier, a third ring gear, a fourth planetary gear set including a fourth sun gear, a fourth planetary carrier, a fourth ring gear, a first rotational shaft including the first sun gear and selectively connected to a transmission housing, a second rotational shaft including the first planetary carrier and directly connected to the input shaft, a third rotational shaft including the first ring gear, the second planetary carrier, the third sun gear, and the fourth sun gear, a fourth rotational shaft including the second sun gear, a fifth rotational shaft including the second ring gear and selectively connected to the first rotational shaft or the second rotational shaft, a sixth rotational shaft including the fourth planetary carrier and directly connected to the output shaft, a seventh rotational shaft including the third planetary carrier and the fourth ring gear and selectively connected to the transmission housing, an eighth rotational shaft including the third ring gear and selectively connected to the fourth rotational shaft or the fifth rotational shaft, and six friction elements interposed between the rotational shafts, or between at least one rotational shaft and the transmission housing so as to connect selectively.

Each of the first, second, third, and fourth planetary gear sets may include a single pinion planetary gear set.

The first, second, third, and fourth planetary gear sets may be sequentially disposed from an engine side.

The six friction elements may include a first clutch interposed between the second rotational shaft and the fifth rotational shaft, a second clutch interposed between the fourth rotational shaft and the eighth rotational shaft, a third clutch interposed between the first rotational shaft and the fifth rotational shaft, a fourth clutch interposed between the fifth rotational shaft and the eighth rotational shaft, a first brake interposed between the first rotational shaft and the transmission housing, and a second brake interposed between the seventh rotational shaft and the transmission housing.

A first forward speed may be achieved by operation of the second brake and the first and second clutch, a second forward speed may be achieved by operation of the second brake and the second and third clutches, a third forward speed may be achieved by operation of the second brake and the first and third clutches, a fourth forward speed may be achieved by operation of the first and second brakes and the third clutch, a fifth forward speed may be achieved by operation of the second brake and the third and fourth clutches, a sixth forward speed may be achieved by operation of the first brake and the third and fourth clutches, a seventh forward speed may be achieved by operation of the first, third and fourth clutches, an eighth forward speed may be achieved by operation of the first brake and the first and fourth clutches, a ninth forward speed may be achieved by operation of the first brake and the second and fourth clutch, a tenth forward speed may be achieved by operation of the first brake and the first and second clutches, an eleventh forward speed may be achieved by operation of the first brake and the second and third clutches, and a reverse speed may be achieved by operation of the second brake and the first and fourth clutches.

According to various aspects of the present invention, a planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, a second ring gear, a third planetary gear set including a third sun gear, a third planetary carrier, a third ring gear, a fourth planetary gear set including a fourth sun gear, a fourth planetary carrier, a fourth ring gear, a first clutch selectively connecting the first planetary carrier with the second ring gear, a second clutch selectively connecting the second sun gear with the third ring gear, a third clutch selectively connecting the first sun gear with the second ring gear, a fourth clutch selectively connecting the second ring gear with the third ring gear, a first brake selectively connecting the first sun gear with a transmission housing, and a second brake selectively connecting the fourth ring gear with the transmission housing, in which the input shaft may be directly connected to the first planetary carrier, the output shaft may be directly connected to the fourth planetary carrier, the first ring gear, the second planetary carrier, the third sun gear, and fourth sun gear may be directly connected to each other, and the third planetary carrier and the fourth ring gear may be directly connected.

Various embodiments of the present invention may achieve eleven forward speed stages by combining four planetary gear sets with six friction elements. Therefore, power delivery performance and fuel economy may be improved.

Also, silent drivability of the vehicle may be improved greatly through the multi-stages of the automatic transmission appropriate to the engine rotation speed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of gear stages of respective friction elements applied to the exemplary planetary gear train according to the present invention.

Figure 1:
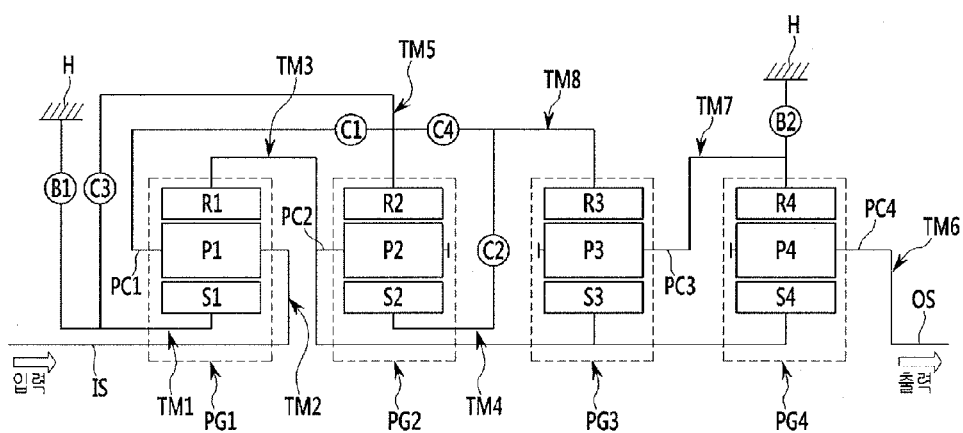
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same shaft line, an input shaft IS, an output shaft OS, eight rotational shafts TM1 to TM8 that directly connect respective rotation elements of the first, second, third, and fourth planetary gear sets PG1, PG2, PG3, and PG4 to each other, six friction elements C1 to C4 and B1 and B2, and a transmission housing H.

As a result, rotational power input from the input shaft IS is transmitted by an inter-complementation operation of the first, second, third, and fourth planetary gear sets PG1, PG2, PG3, and PG4 to be output through the output shaft OS.

In addition, the respective simple planetary gear sets are disposed in the order of the first, second, third, and fourth planetary gear sets PG1, PG2, PG3, and PG4 from an engine side.

The input shaft IS is an input member and rotational power from a crankshaft of an engine is torque-converted through a torque converter to be input into the input shaft IS.

The output shaft OS as an output member is disposed on the same axial line as the input shaft IS and transfers transmitted driving power to a driving shaft through a differential.

The first planetary gear set PG1 as a single-pinion planetary gear set includes a first sun gear S1, a first planetary carrier PC1 that supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that supports a second pinion P2 which outer-engages with the second sun gear S2, and a second ring gear R2 which inner-engages with the second pinion P2.

The third planetary gear set PG3 as the single-pinion planetary gear set includes a third sun gear S3, a third planetary carrier PC3 that supports a third pinion P3 which outer-engages with the third sun gear S3, and a third ring gear R3 which inner-engages with the third pinion P3.

The fourth planetary gear set PG4 as the single-pinion planetary gear set includes a fourth sun gear S4, a fourth planetary carrier PC4 that supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

In this case, two rotation elements in each of the third, fourth planetary gear set PG3, PG4 are directly connected to each other to operate as one compound planetary gear set with four rotation elements.

Configurations of the eight rotational shafts TM1 to TM8 will be described below.

The first rotational shaft TM1 includes the first sun gear S1, is selectively connected to a transmission housing H.

The second rotational shaft TM2 includes the first planet carrier PC1 and is directly connected to the input shaft IS so as to be always operated as an input element.

The third rotational shaft TM3 includes the first ring gear R1, the second planetary carrier PC2, the third sun gear S3, the fourth sun gear S4.

The fourth rotational shaft TM4 includes the second sun gear S2.

The fifth rotational shaft TM5 includes the second ring gear R2 and is selectively connected to the first rotational shaft TM1 or the second rotational shaft TM2.

The sixth rotational shaft TM6 includes the fourth planetary carrier PC4 and is directly connected to the output shaft OS.

The seventh rotational shaft TM7 includes the third planetary carrier PC3 and the fourth ring gear R4 and is selectively connected to transmission housing H.

The eighth rotational shaft TM8 includes the third ring gear R3 and is selectively connected to the fourth rotational shaft TM4 and the fifth rotational shaft TM5.

In addition, among the rotational shafts TM1 to TM8, four clutches C1, C2, C3, and C4 which are friction elements are disposed at portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4 and B1 to B2 will be described below.

The first clutch C1 is interposed between the second rotational shaft TM2 and the fifth rotational shaft TM5, and selectively connects the second rotational shaft TM2 with the fifth rotational shaft TM5.

The second clutch C2 is interposed between the fourth rotational shaft TM4 and the eighth rotational shaft TM8, and selectively connects the fourth rotational shaft TM4 with the eighth rotational shaft TM8.

The third clutch C3 is interposed between the first rotational shaft TM1 and the fifth rotational shaft TM5, and selectively connects the first rotational shaft TM1 with the fifth rotational shaft TM5.

The fourth clutch C4 is interposed between the fifth rotational shaft TM5 and the eighth rotational shaft TM8, and selectively connects the fifth rotational shaft TM5 with the eighth rotational shaft TM8.

The first brake B1 is interposed between the first rotational shaft TM1 and the transmission housing H, and causes the first rotational shaft TM1 to be operated as the selective fixed element.

The second brake B2 is interposed between the seventh rotational shaft TM7 and the transmission housing H, and causes the seventh rotational shaft TM7 to be operated as the selective fixed element.

The respective friction elements including the first, second, third, and fourth clutches C1, C2, C3, and C4 and the first and second brakes B1 and B2 as described above may be configured by multiple-disk hydraulic friction joining units which are friction-joined by hydraulic pressure.

FIG. 2 is an operation table for each of gear stages of respective friction elements applied to the planetary gear train according to various embodiments of the present invention.

As shown in FIG. 2, in the planetary gear train according to various embodiments of the present invention, while three friction elements operate in the respective gear stages, a transmission is performed.

The second brake B2 and the first, second clutches C1 and C2 are operated at a first forward speed 1ST.

The second brake B2 and the second, third clutches C2 and C3 are operated at a second forward speed 2ND.

The second brake B2 and the first, third clutches C1 and C3 are operated at a third forward speed 3RD.

The first and second brakes B1 and B2 and the second and third clutch C3 are operated at a fourth forward speed 4TH.

The second brake B2 and the third, fourth clutches C3 and C4 are operated at a fifth forward speed 5TH.

The first brake B1 and the third, fourth clutches C3 and C4 are operated at a sixth forward speed 6TH.

The first, third, fourth clutches C1, C3, and C4 are operated at a seventh forward speed 7TH.

The first brake B1 and the first, fourth clutches C1 and C4 are operated at an eighth forward speed 8TH.

The first brake B1 and the second, fourth clutches C2 and C4 are operated at a ninth forward speed 9TH.

The first brake B1 and the first, second clutches C1 and C2 are operated at a tenth forward speed 10TH.

The first brake B1 and the second, third clutches C2 and C3 are operated at an eleven forward speed 11TH.

The second brake B2 and the first and fourth clutches C1 and C4 are operated at a reverse speed REV.

Hereinafter, the transmission process will be described in detail.

In the first forward speed 1ST, the second brake B2 and the first, second clutch C1 and C2 are operated. Thus, while the second rotational shaft TM2 is connected to the fifth rotational shaft TM5 by operation of the first clutch C1 and the fourth rotational shaft TM4 is connected to the eighth rotational shaft TM8 by operation of the second clutch C2, the input is made into the second rotational shaft TM2, the seventh rotational shaft TM7 operates as the fixation element by operation of the second brake B2. As a result, the first forward speed 1ST of which the output is the sixth rotational shaft TM6 is performed.

In the second forward speed 2ND, the second brakes B2 and the second, third clutch C2 and C3 are operated. Thus, while the fourth rotational shaft TM4 is connected to the eighth rotational shaft TM8 by operation of the second clutch C2 and the first rotational shaft TM1 is connected to the fifth rotational shaft TM5 by operation of the third clutch C3, the input is made into the second rotational shaft TM2, the seventh rotational shaft TM7 operates as the fixation element by operation of the second brake B2. As a result, the second forward speed 2ND of which the output is the sixth rotational shaft TM6 is performed.

In the third forward speed 3RD, the second brake B2 and the first, third clutch C1 and C3 are operated. Thus, while the second rotational shaft TM2 is connected to the fifth rotational shaft TM5 by operation of the first clutch C1 and the first rotational shaft TM1 is connected to the fifth rotational shaft TM5 by operation of the third clutch C3, the input is made into the second rotational shaft TM2, the seventh rotational shaft TM7 operates as the fixation element by operation of the second brake B2. As a result, the third forward speed 3RD of which the output is the sixth rotational shaft TM6 is performed.

In the fourth forward speed 4TH, the first and second brakes B1 and B2 and the third clutch C3 are operated. Thus, while the first rotational shaft TM1 is connected to the fifth rotational shaft TM5 by operation of the third clutch C3, the input is made into the second rotational shaft TM2 and the first rotational shaft TM1 and the seventh rotational shaft TM7 operates as the fixation element by operation of the first, second brake B1 and B2. As a result, the fourth forward speed 4TH of which the output is the sixth rotational shaft TM6 is performed.

In the fifth forward speed 5TH, the second brake B2 and the third, fourth clutch C3 and C4 are operated. Thus, while the first rotational shaft TM1 is connected to the fifth rotational shaft TM5 by operation of the third clutch C3 and the fifth rotational shaft TM5 is connected to the eighth rotational shaft TM8 by operation of the fourth clutch C4, the input is made into the second rotational shaft TM2, the seventh rotational shaft TM7 operates as the fixation element by operation of the second brake B2. As a result, the fifth forward speed 5TH of which the output is the sixth rotational shaft TM6 is performed.

In the sixth forward speed 6TH, the first brake B1 and the third, fourth clutch C3 and C4 are operated. Thus, while the first rotational shaft TM1 is connected to the fifth rotational shaft TM5 by operation of the third clutch C3 and the fifth rotational shaft TM5 is connected to the eighth rotational shaft TM8 by operation of the fourth clutch C4, the input is made into the second rotational shaft TM2, the first rotational shaft TM1 operates as the fixation element by operation of the first brake B1. As a result, the sixth forward speed 6TH of which the output is the sixth rotational shaft TM6 is performed.

In the seventh forward speed 7TH, the first, third, fourth clutch C1, C3, and C4 are operated. Thus, while the second rotational shaft TM2 is connected to the fifth rotational shaft TM5 by operation of the first clutch C1 and the first rotational shaft TM1 is connected to the fifth rotational shaft TM5 by operation of the third clutch C3 and the fifth rotational shaft TM5 is connected to the eighth rotational shaft TM8 by operation of the fourth clutch C4, the input is made into the second rotational shaft TM2. As a result, in a state of direct coupling as a whole, the seventh forward speed 7TH of which the output is the sixth rotational shaft TM6 as received from the input is performed.

In the eighth forward speed 8TH, the first brake B1 and the first, fourth clutch C1 and C4 are operated. Thus, while the second rotational shaft TM2 is connected the fifth rotational shaft TM5 by operation of the first clutch C1 and the fifth rotational shaft TM5 is connected to the eighth rotational shaft TM8 by operation of the fourth clutch C4, the input is made into the second rotational shaft TM2, the first rotational shaft TM1 operates as the fixation element by operation of the first brake B1. As a result, the eighth forward speed 8TH of which the output is the sixth rotational shaft TM6 is performed.

In the ninth forward speed 9TH, the first brake B1 and the second, fourth clutch C2 and C4 are operated. Thus, while the fourth rotational shaft TM4 is connected the eighth rotational shaft TM8 by operation of the second clutch C2 and the fifth rotational shaft TM5 is connected to the eighth rotational shaft TM8 by operation of the fourth clutch C4, the input is made into the second rotational shaft TM2, the first rotational shaft TM1 operates as the fixation element by operation of the first brake B1. As a result, the ninth forward speed 9TH of which the output is the sixth rotational shaft TM6 is performed.

In the tenth forward speed 10TH, the first brake B1 and the first, second clutch C1 and C2 are operated. Thus, while the second rotational shaft TM2 is connected the fifth rotational shaft TM5 by operation of the first clutch C1 and the fourth rotational shaft TM4 is connected to the eighth rotational shaft TM8 by operation of the second clutch C2, the input is made into the second rotational shaft TM2, the first rotational shaft TM1 operates as the fixation element by operation of the first brake B1. As a result, the tenth forward speed 10TH of which the output is the sixth rotational shaft TM6 is performed.

In the eleventh forward speed 11TH, the first brake B1 and the second, third clutch C2 and C3 are operated. Thus, while the fourth rotational shaft TM4 is connected the eighth rotational shaft TM8 by operation of the second clutch C2 and first rotational shaft TM1 is connected to the fifth rotational shaft TM5 by operation of the third clutch C3, the input is made into the second rotational shaft TM2, the first rotational shaft TM1 operates as the fixation element by operation of the first brake B1. As a result, the eleventh forward speed 11TH of which the output is the sixth rotational shaft TM6 is performed.

In the reverse speed REV, the second brake B2 and the first and fourth clutches C1 and C4 are operated. Thus, while the second rotational shaft TM2 is connected the fifth rotational shaft TM5 by operation of the first clutch C1 and the fifth rotational shaft TM5 is connected the eighth rotational shaft TM8 by operation of the fourth clutch C4, the input is made into the second rotational shaft TM2, the seventh rotational shaft TM7 operates as the fixation element by operation of the second brake B2. As a result, the reverse speed REV of which the output is the sixth rotational shaft TM6 is performed.

As described above, in the planetary gear train according to various embodiments of the present invention, four planetary gear sets PG1, PG2, PG3, and PG4 may implement the eleven forward speeds and one reverse speed through the operation-control of four clutches C1, C2, C3, and C4 and two brakes B1, and B2.

In addition, the planetary gear train according to various embodiments of the present invention may improve the power transmission efficiency and the fuel efficiency through the multi-stages of the automatic transmission.

Also, silent drivability of vehicle may be improved greatly through the multi-stages of the automatic transmission appropriate to the engine rotation speed.

Moreover, three friction elements operate for each transmission stage, and as a result, a friction drag loss is decreased by minimizing the number of friction elements which do not operate, thereby improving the power transmission efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
   an input shaft receiving torque of an engine;
   an output shaft outputting changed torque;
   a first planetary gear set including a first sun gear, a first planetary carrier, and a first ring gear;
   a second planetary gear set including a second sun gear, a second planetary carrier, a second ring gear;

a third planetary gear set including a third sun gear, a third planetary carrier, a third ring gear;

a fourth planetary gear set including a fourth sun gear, a fourth planetary carrier, a fourth ring gear;

a first rotational shaft including the first sun gear and selectively connected to a transmission housing;

a second rotational shaft including the first planetary carrier and directly connected to the input shaft;

a third rotational shaft including the first ring gear, the second planetary carrier, the third sun gear, and the fourth sun gear;

a fourth rotational shaft including the second sun gear;

a fifth rotational shaft including the second ring gear and selectively connected to the first rotational shaft or the second rotational shaft;

a sixth rotational shaft including the fourth planetary carrier and directly connected to the output shaft;

a seventh rotational shaft including the third planetary carrier and the fourth ring gear and selectively connected to the transmission housing;

an eighth rotational shaft including the third ring gear and selectively connected to the fourth rotational shaft or the fifth rotational shaft; and six friction elements interposed between the rotational shafts, or between at least one rotational shaft and the transmission housing so as to connect selectively.

2. The planetary gear train of claim 1, wherein each of the first, second, third, and fourth planetary gear sets comprises a single pinion planetary gear set.

3. The planetary gear train of claim 2, wherein the first, second, third, and fourth planetary gear sets are sequentially disposed from an engine side.

4. The planetary gear train of claim 1, wherein the six friction elements comprise:
 a first clutch interposed between the second rotational shaft and the fifth rotational shaft;
 a second clutch interposed between the fourth rotational shaft and the eighth rotational shaft;
 a third clutch interposed between the first rotational shaft and the fifth rotational shaft;
 a fourth clutch interposed between the fifth rotational shaft and the eighth rotational shaft;
 a first brake interposed between the first rotational shaft and the transmission housing; and
 a second brake interposed between the seventh rotational shaft and the transmission housing.

5. The planetary gear train of claim 4, wherein a first forward speed is achieved by operation of the second brake and the first and second clutch,
 a second forward speed is achieved by operation of the second brake and the second and third clutches,
 a third forward speed is achieved by operation of the second brake and the first and third clutches,
 a fourth forward speed is achieved by operation of the first and second brakes and the third clutch,
 a fifth forward speed is achieved by operation of the second brake and the third and fourth clutches,
 a sixth forward speed is achieved by operation of the first brake and the third and fourth clutches,
 a seventh forward speed is achieved by operation of the first, third and fourth clutches,
 an eighth forward speed is achieved by operation of the first brake and the first and fourth clutches,
 a ninth forward speed is achieved by operation of the first brake and the second and fourth clutch,
 a tenth forward speed is achieved by operation of the first brake and the first and second clutches,
 an eleventh forward speed is achieved by operation of the first brake and the second and third clutches, and
 a reverse speed is achieved by operation of the second brake and the first and fourth clutches.

6. A planetary gear train of an automatic transmission for vehicles, comprising:
 an input shaft receiving torque of an engine;
 an output shaft outputting changed torque;
 a first planetary gear set including a first sun gear, a first planetary carrier, and a first ring gear;
 a second planetary gear set including a second sun gear, a second planetary carrier, a second ring gear;
 a third planetary gear set including a third sun gear, a third planetary carrier, a third ring gear;
 a fourth planetary gear set including a fourth sun gear, a fourth planetary carrier, a fourth ring gear;
 a first clutch selectively connecting the first planetary carrier with the second ring gear;
 a second clutch selectively connecting the second sun gear with the third ring gear;
 a third clutch selectively connecting the first sun gear with the second ring gear;
 a fourth clutch selectively connecting the second ring gear with the third ring gear;
 a first brake selectively connecting the first sun gear with a transmission housing; and
 a second brake selectively connecting the fourth ring gear with the transmission housing,
 wherein the input shaft is directly connected to the first planetary carrier,
 the output shaft is directly connected to the fourth planetary carrier,
 the first ring gear, the second planetary carrier, the third sun gear, and fourth sun gear are directly connected to each other, and
 the third planetary carrier and the fourth ring gear are directly connected.

7. The planetary gear train of claim 6, wherein each of the first, second, third, and fourth planetary gear set comprises a single pinion planetary gear set.

8. The planetary gear train of claim 7, wherein the first, second, third, and fourth planetary gear sets are sequentially disposed from an engine side.

9. The planetary gear train of claim 6, wherein a first forward speed is achieved by operation of the second brake and the first and second clutch,
 a second forward speed is achieved by operation of the second brake and the second and third clutches,
 a third forward speed is achieved by operation of the second brake and the first and third clutches,
 a fourth forward speed is achieved by operation of the first and second brakes and the third clutch,
 a fifth forward speed is achieved by operation of the second brake and the third and fourth clutches,
 a sixth forward speed is achieved by operation of the first brake and the third and fourth clutches,
 a seventh forward speed is achieved by operation of the first, third and fourth clutches,
 an eighth forward speed is achieved by operation of the first brake and the first and fourth clutches,
 a ninth forward speed is achieved by operation of the first brake and the second and fourth clutch,
 a tenth forward speed is achieved by operation of the first brake and the first and second clutches,
 an eleventh forward speed is achieved by operation of the first brake and the second and third clutches, and a reverse speed is achieved by operation of the second brake and the first and fourth clutches.

\* \* \* \* \*